(No Model.)
F. C. STEPHENSON.
MILK AERATOR.
No. 553,437. Patented Jan. 21, 1896.
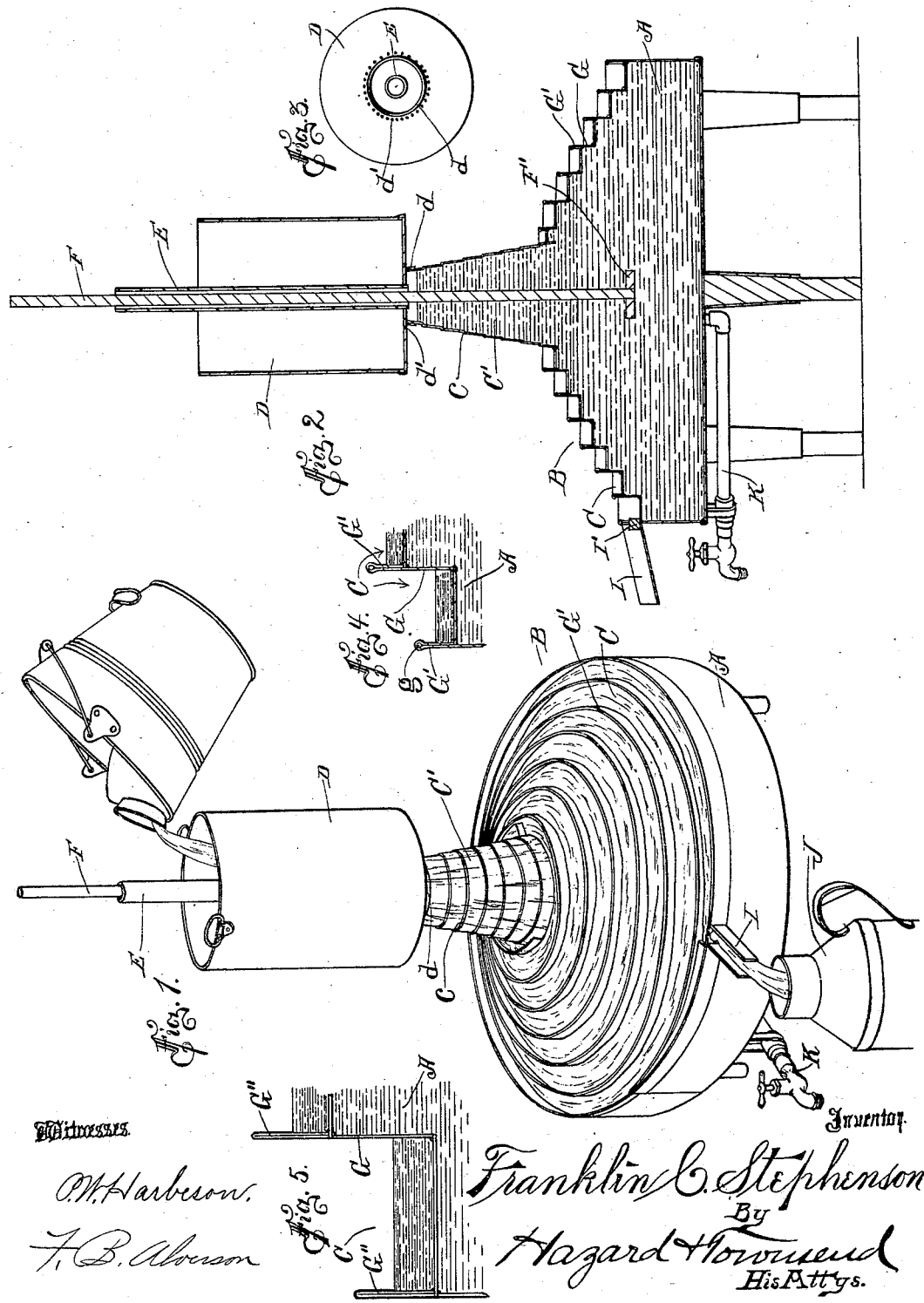
Witnesses.
O. W. Harbeson.
F. B. Alverson.
Inventor.
Franklin C. Stephenson
By
Hazard & Townsend
His Attys.
ANDREW B. GRAHAM, PHOTO-LITHO, WASHINGTON, D.C.

UNITED STATES PATENT OFFICE.

FRANKLIN C. STEPHENSON, OF GREEN MEADOWS, CALIFORNIA.

MILK-AERATOR.

SPECIFICATION forming part of Letters Patent No. 553,437, dated January 21, 1896.

Application filed November 19, 1894. Serial No. 529,245. (No model.)

*To all whom it may concern:*

Be it known that I, FRANKLIN C. STEPHENSON, a citizen of the United States, residing at Green Meadows, in the county of Los Angeles and State of California, have invented a new and useful Milk-Aerator, of which the following is a specification.

My invention relates to devices designed to aerate and extract the animal heat from milk to place it in proper condition for market or for keeping.

The object of my invention is to provide a cheap, simple and efficient device of this class which may be manufactured by any ordinary tinsmith, and will be adapted for use in localities where facilities for the aeration of milk are ordinarily unattainable.

It is highly essential to the successful operation of a milk-aerator that the milk be uniformly and evenly cooled and exposed to the air, so that every part of the milk will be aerated and the animal heat extracted therefrom. It is necessary in order to accomplish this that the channel in which the milk flows be flat-bottomed, so that the milk flowing therealong will be of uniform depth. It is also essential that the pitch of the channel be sufficient to cause the milk to flow quite rapidly along the channel in order that the milk may be agitated and every part brought to the surface and exposed to the action of the air.

Heretofore it has been proposed to make an aerator having a rounded or slightly-conical top and to secure upon this top a sheet-metal helix in such a manner as to form a spiral channel. In this form the pitch of the channel is limited by the taper of the top, and as the pitch of the channel is increased the taper of the top is increased, so that if a channel of sufficient grade to carry the milk rapidly therealong is provided the bottom of the channel will be at a considerable angle with the horizon, so that the depth of milk at the lower or outer side of such channel will be much greater than at the inner side of the channel, which is objectionable, as hereinbefore set forth. It has also been proposed to secure a helix spirally around a receptacle having vertical side walls, such helix projecting outward from the walls of the receptacle at an acute angle therewith. In addition to the objectionable feature of the milk being of unequal depth in the channel, this construction has the objection of being extremely difficult to cleanse, and this feature alone would preclude its successful introduction for the aeration of milk.

My invention relates to the means whereby I am enabled to form an aerator having a spiral channel, the bottom of which is horizontally arranged and the sides of which are vertically arranged, and whereby I am enabled to vary the pitch or inclination of the channel and still to always have the bottom of the channel horizontal, so that the milk will always flow through the channel in a stream of uniform depth, and will be perfectly cooled and aerated.

The accompanying drawings illustrate my invention.

Figure 1 is a perspective elevation of my improved milk-aerator in operation. Fig. 2 is a vertical mid-section of the same. Fig. 3 is a bottom view of the milk-reservoir, which is arranged to fit upon the upwardly-projecting neck of the water-chamber. Fig. 4 is an enlarged detail of one form of the side wall of the channel. Fig. 5 is a like view of another form of side wall.

My improved milk-aerator comprises a water-chamber A, having its top B provided with a spiral channel C, and, as shown in the drawings, I arrange this channel leading from near the center of the top to the circumference. The water-chamber is preferably circular, as shown, and is also provided with the centrally-arranged upwardly-projecting tapering neck C', which is provided with a series of annular rings $c$ arranged to impede the passage of the milk downward along the neck.

A milk-reservoir D, which is provided with a downwardly-projecting flange $d$, is arranged to fit upon the top of the neck C'. This milk-reservoir is also provided with a dasher-tube E, which is secured to the bottom of the milk-reservoir, and passes upward through such reservoir to allow the dasher-handle F to extend above the reservoir so it can be actuated to cause the dasher F' to agitate and thoroughly mix the water within the chamber when necessary.

In making my improved aerator I take a piece of tin or other suitable material of a diameter equal to the diameter of the water-chamber to be formed and cut it into a spiral. The center of the spiral is pulled upward to separate the various convolutions from each other, and a vertical strip G is soldered to the edges of the convolutions, as shown in Figs. 1 and 2. This strip, as shown in Figs. 2 and 4, is sufficiently wide to project upward above the outer edge of each of the convolutions and is bent downward and doubled upon itself to form the outer wall G' of the channel. As shown in Fig. 4, the upper edge of this wall is strengthened by a wire g, while in Fig. 5 the strip G is arranged to form only the inner wall of the channel, and a separate strip G'', doubled upon itself, is soldered upon the outer edges of the convolutions to form the outer wall of the channel. It will thus be seen that the milk-channel is formed by two helixes of sheet metal, one of which is arranged with its greatest width horizontal, and the other of which is arranged with its greatest width vertical and the two helixes are secured together from end to end with the upper edge of the vertical helix projecting above the plane of the horizontal helix, thus forming a flat-bottomed spiral channel along which the milk flows and is uniformly and evenly cooled and exposed to the air. A suitable spout I is arranged to conduct the milk from the end of the channel into a receptacle J.

I' is a stopper adapted to close the opening from the channel into the spout.

In practice the water-chamber A is filled with water either by means of a hose or by pouring water into the neck C'. The entire chamber, including the neck, is filled with water, and the milk-reservoir D is placed in position upon the neck and is filled with milk, which runs out through the perforations d', which are arranged to discharge the milk downward upon the neck, along which the milk flows, the rings c retarding its progress and causing it to be thoroughly exposed to the air during its passage downward into the channel. When it reaches the channel it flows gently downward therealong, the heat being gradually absorbed by the water in the water-chamber, and the milk is discharged from the spout I thoroughly cooled and aerated.

By reason of providing the milk-impeding rings upon the tapering neck the milk is delivered upon the neck from the perforations in the milk-reservoir, and flowing downward along the neck is impeded by the rings and is caused to spread evenly over the entire surface of the neck and becomes practically aerated before it reaches the spiral channel C, and by reason of this channel being flat-bottomed the milk in flowing downward therealong is of no great depth at any point, and by the time it reaches the lower end of the channel it is in the most favorable condition possible for preservation.

Where water under pressure is convenient, a constant flow of water through the chamber may be provided for by a proper arrangement of pipes; but I have not illustrated this, for the reason that it forms no part of my invention and will be readily understood by those versed in the art.

Where it is inconvenient to have a supply of running water, the dasher F' is actuated whenever the water becomes so warm near the top of the chamber as to not properly cool the milk, and by means of this dasher the cold water near the bottom of the chamber is thoroughly mixed with the warm water at the top, and the milk is rapidly cooled.

K is a discharge-spout through which the water in the chamber is discharged when it becomes too warm.

Now, having described my invention, what I claim as new, and desire to secure by Letters Patent, is—

1. A milk aerator having its cooling chamber provided with a top formed of two sheet metal helixes, one helix having its convolutions in vertical planes and the other helix having its convolutions in horizontal planes, the two helixes being secured together from end to end with the upper edge of each convolution of the vertical helix projecting above the plane of the corresponding convolution of the horizontal helix to form thereby an inclined flat bottomed spiral channel.

2. A milk aerator having its cooling chamber provided with a top formed of two sheet metal helixes, one helix having its convolutions in vertical planes and the other helix having its convolutions in horizontal planes, the two helixes being secured together from end to end with the upper edge of each convolution of the vertical helix projecting above the plane of the corresponding convolution of the horizontal helix to form thereby an inclined flat bottomed spiral channel; the centrally arranged tapering neck provided with the annular milk impeding rings; and the milk reservoir arranged to fit upon the top of such neck and provided with the perforations arranged to discharge the milk against the tapering neck.

3. A milk aerator having a convolute spiral channel formed by securing together two helixes, one helix having its convolutions arranged in vertical planes, and the other helix having its convolutions arranged in horizontal planes, the inner edge of each convolution of the horizontal helix being secured to the bottom of the corresponding inner convolution of the vertical helix, and its outer edge being secured to the inner face of the corresponding outer convolution of the vertical helix intermediate the top and bottom edges of such convolution.

F. C. STEPHENSON.

Witnesses:
    ALFRED I. TOWNSEND,
    WINIFRED L. DAVIS.